United States Patent [19]

Pergande et al.

[11] Patent Number: 5,726,657
[45] Date of Patent: Mar. 10, 1998

[54] PHASE COHERENT RADAR SYSTEM USING FAST FREQUENCY AGILE WAVEFORM SYNTHESIS

[75] Inventors: Albert N. Pergande; Daniel J. O'Donnell; Albert S. Sabin, all of Orlando, Fla.

[73] Assignee: Lockheed Martin Corporation, Bethesda, Md.

[21] Appl. No.: 620,363

[22] Filed: Mar. 22, 1996

[51] Int. Cl.$^6$ .............................. G01S 7/292; G01S 13/72
[52] U.S. Cl. .................. 342/202; 342/62; 342/97; 342/131; 342/137; 342/140; 342/194; 342/196; 342/188
[58] Field of Search .................. 342/202, 62, 90, 342/97, 131, 137, 140, 141, 162, 188, 194, 195, 196, 201, 203

[56] References Cited

U.S. PATENT DOCUMENTS

| | | | |
|---|---|---|---|
| 4,155,088 | 5/1979 | Taylor, Jr. et al. | 342/131 |
| 4,194,204 | 3/1980 | Alpers | 342/80 |
| 4,338,604 | 7/1982 | Petitjean | 342/201 |
| 4,382,258 | 5/1983 | Tabourier | 342/110 |
| 4,593,286 | 6/1986 | Mathews et al. | 342/88 |
| 4,665,401 | 5/1987 | Garrard et al. | 342/75 |
| 4,851,848 | 7/1989 | Wehner | 342/25 |
| 5,091,730 | 2/1992 | Cardiasmenos et al. | 342/153 |
| 5,184,136 | 2/1993 | Cardiasmenos | 342/153 |
| 5,245,347 | 9/1993 | Bonta et al. | 342/149 |
| 5,347,283 | 9/1994 | Krizek et al. | 342/201 |

*Primary Examiner*—John B. Sotomayor
*Attorney, Agent, or Firm*—Burns, Doane, Swecker & Mathis, L.L.P.

[57] ABSTRACT

A radar system in which a frequency agile synthesizer is used to provide rapid frequency shifts and in which measures are taken to maintain phase coherency. The system is fully coherent such that all signals are derived from a common source and are capable of high pulse repetition rates in excess of 1 MHz. There are no inherent transmit duty cycle restrictions and the system is able to transmit complex phase and frequency modulated waveforms. A frequency interleaving scheme is used to resolve range ambiguities at high pulse repetition frequencies and the use of a complementary phase coding scheme allows a high range resolution processing with the transmitted waveforms.

27 Claims, 4 Drawing Sheets

PHASE COHERENT RADAR SYSTEM USING FAST FREQUENCY AGILE WAVEFORM SYNTHESIS

BACKGROUND OF THE INVENTION

1. Field of the Invention

The present invention is directed to a system which is capable of tracking or classifying objects over a wide range of conditions. In particular, the present invention is directed to a system which sends out an electromagnetic pulse and analyzes a return signal reflected from an object to obtain information about the object such as its distance, velocity, or form. In particular, the invention is directed to a system of the general nature described above in which a frequency agile synthesizer is used to provide rapid frequency shifts in a system in which measures are taken to maintain phase coherency.

2. Description of the Related Art

Generally, radar operates by radiating electromagnetic energy and detecting return signal from a reflecting object. See, Skolnick, *Radar Handbook*, (McGraw-Hill, Inc., 2d. Ed., 1990). The principles of radar have been applied from frequencies of a few megahertz to well beyond the optical region (laser radar). Millimeter-wave radar is generally understood to be radar operating in the frequency region of 40 to 300 GHz. One band in this region is the W band, which is nominally the frequency range of 75 GHz to 110 GHz. Radar systems generally include a transmitter, an antenna, a receiver, signal processing equipment, and data processing equipment.

One particular application for systems operating in the millimeter-wave region of the spectrum is in projectiles ("seekers") which generate a millimeter wave signal, send it toward a target, and analyze the return signal to generate directional information.

One problem that occurs when detecting targets by seeker systems is range ambiguity where a target appears to be at a much shorter range than it actually is. Range ambiguity occurs when the roundtrip transit time for the most distant target to be detected is longer than the interpulse period. More particularly, if a target is detected whose transit time exceeds the interpulse period, the echo of one pulse will be received after the next pulse has been transmitted so that the target is improperly detected to be at a range that is too close.

It is known to gauge the range ambiguities and the return from a single target by a number of interpulse periods spanned by the transit time. That is, the range ambiguities are gauged by whether the target's echoes are received during the first, second, third, etc. interpulse period following the transmission of the pulses that produce them. An echo received during the first interpulse period is called a single-time-around echo and echoes received during subsequent periods are called multiple-time-around echoes (MTAEs).

For a given PRF, the longest range from which single time around echoes can be received, and the longest range from which any return may be received without the observed ranges being ambiguous for that matter, is called the maximum unambiguous range or the unambiguous range. This unambiguous range is commonly represented by $R_u$ and because the roundtrip transit time for the unambiguous range equals the interpulse period $$R_u = cT/2$$

where c equals the speed of light and T equals the interpulse period, $$T = f/1,$$

with $$f = PRF$$

The possibility of range ambiguities may be eliminated by making the PRF low enough to place the unambiguous range beyond the maximum range at which any target is likely to be detected. However, because large targets may be detected at very great ranges, it may be impractical to set the PRF too low even when a comparatively low PRF might otherwise be acceptable. On the other hand, it may be that the probability of detecting large targets is slight for the expected conditions of use and the consequences of sometimes mistaking these targets for targets at closer range may be tolerable. If targets at greater ranges than the unambiguous range are of no concern, the range ambiguity problem may be solved by simply rejecting all returns from distances beyond the unambiguous range.

One technique of rejecting the returns is PRF jittering which takes advantage of the dependence of the apparent ranges of targets beyond the unambiguous range on the PRF. In this technique, however, the time-on-target is generally limited since it must be divided between the two PRFs which cuts the total potential integrated time in half and reduces the maximum detection range.

To resolve range ambiguities when the PRF must be made so high that the maximum range of interest is longer than the unambiguous range, various techniques may be employed.

SUMMARY OF THE INVENTION

The present invention is embodied as a high performance MMW system. In one aspect, the system is fully coherent because all of its transmitted signals derive from a common source. The system is also capable of high pulse repetition rates and can transmit duty cycles of 0 to 100%. The system is able to transmit complex phase and frequency modulated waveforms by using a frequency interleaving scheme at high PRF. It preferably uses a complementary phase coding scheme to allow high range resolution profile processing. The system resolves range ambiguity through the use of frequency interleaving. It varies the frequency of successively transmitted pulses, detects corresponding variations in the target echoes, and then uses the detected variation to match the echo to the transmitted pulse which created it.

In one aspect, the invention is an apparatus comprising a waveform generator for generating a waveform and a second output coherent with the waveform, the waveform generator including a frequency agile synthesizer capable of changing its output frequency at a high speed, the frequency and phase of the waveform and the second output being based on the output of the frequency synthesizer. An antenna coupled to the waveform generator transmits the waveform, receives a return signal, and generates at least one antenna output signal on the basis of the return signal. The system also includes a receiver coupled to the antenna and to the waveform generator, the receiver receiving the antenna output signal and the second output and converting the return signal on the basis of the second output signal to produce a converted signal. The system also has a processor for processing the converted signal to derive target data.

Preferably, the frequency agile synthesizer is capable of changing its output frequency in a psuedorandom manner, of changing its output pulse width, and of changing its pulse repetition frequency. It is also preferably capable of impressing an arbitrary phase code on each pulse transmitted in which case the processor will perform pulse compression on the basis of the phase code.

The waveform generator may include a millimeter wave phase locked oscillator connected to the frequency agile synthesizer for generating a millimeter wave oscillator output which is phase coherent with the frequency agile synthesizer output frequency, and a frequency upconverter connected to the frequency agile synthesizer and to the phase locked oscillator for generating an upconverted output signal which is a millimeter wave multiple of and phase coherent with the frequency agile synthesizer output. The waveform generator may further include a first frequency multiplier having the waveform as its output, a second frequency multiplier having the second output as its output, and a switch connected to the frequency upconverter for selectably connecting the upconverted output signal to the first frequency multiplier or the second frequency multiplier under control of the frequency agile synthesizer. The frequency agile synthesizer may control the switch to connect the upconverted output signal to the first frequency multiplier during a transmit operation and to connect the upconverted output signal to the second frequency multiplier during a receive operation.

The antenna may be a Cassegrainian dual-reflector antenna having a plurality of subassemblies for providing monopulse returns in both azimuth and elevation. The plurality of subassemblies may comprise a collimator, a circular polarizer and an amplitude monopulse feed.

The receiver may include at least one frequency downconverter connected to the antenna for converting the antenna output signal to a lower frequency signal, with the downconverter being connected to receive the second output and generating the lower frequency signal to be phase coherent with the second output. The receiver may also include at least one IF receiver connected to the frequency downconverter for converting the lower frequency signal to baseband in-phase and quadrature outputs.

The antenna may produce a first antenna output signal and a second antenna output signal. The receiver may then comprise a first frequency downconverter connected to the antenna for converting the first antenna output signal to a first lower frequency signal and a second frequency downconverter connected to the antenna for converting the second antenna output signal to a second first lower frequency signal as well as downconverter and the second frequency downconverter for converting the first and second lower frequency signals to baseband in-phase and quadrature outputs.

The processor processes the converted signal to derive target detection data and/or target tracking data. It may also send phase codes to transmit to the frequency agile synthesizer, such that the phase codes may be compressed when received by the processor.

In another aspect the invention comprises a method including the steps of generating a waveform and a second output coherent with the waveform by using a frequency agile synthesizer capable of changing its output frequency at a high speed, the frequency and phase of the waveform and the second output being based on the output frequency of the frequency synthesizer, transmitting the waveform, receiving a return signal, generating at least one antenna signal on the basis of the return signal, converting the return signal on the basis of the second output signal to produce a converted signal, and processing the converted signal to derive target data.

The frequency agile synthesizer may change its output frequency in a psuedorandom manner, change its output pulse width, change its pulse repetition frequency, or impress an arbitrary phase code on each pulse transmitted.

Waveform generation may be accomplished by upconverting the output of the frequency agile synthesizer to produce an upconverted output signal which is a millimeter wave multiple of and phase coherent with the frequency agile synthesizer output, and selectably connecting the upconverted output signal under control of the frequency agile synthesizer to a first frequency multiplier to produce the waveform or a second frequency multiplier to produce the second output.

The converting step may be carried out by converting the antenna output signal to a lower frequency signal which is phase coherent with the second output.

Further scope of applicability of the present invention will become apparent from the detailed description given hereinafter. However, it should be understood that the detailed description and specific examples, while indicating preferred embodiments of the invention are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, wherein.

DETAILED DESCRIPTION

Figure 1:
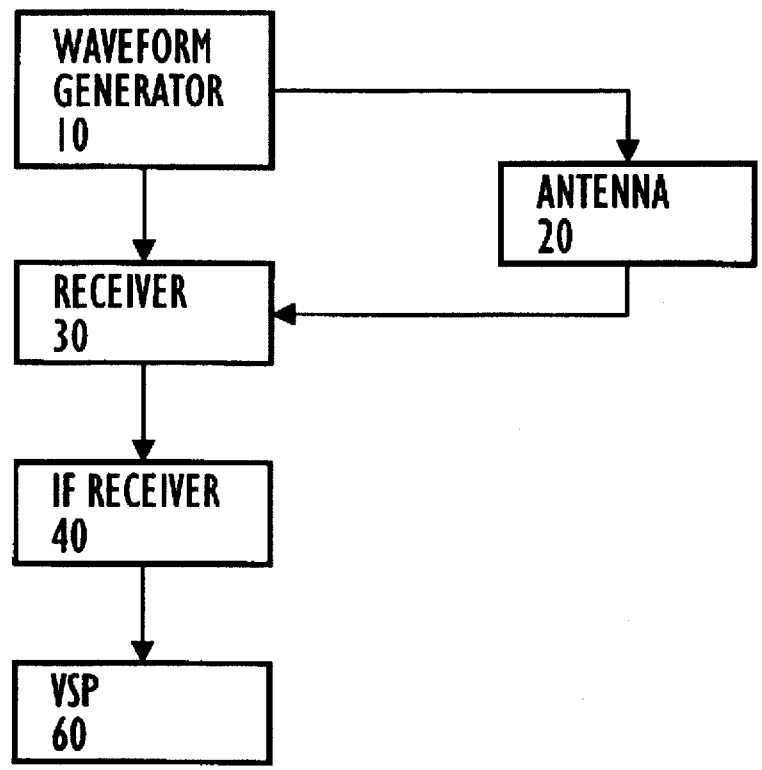
FIG. 1 is a functional block diagram for a millimeter wave system according to a first presently preferred embodiment of the present invention.

FIG. 1 is a functional block diagram of a first presently preferred embodiment of the present invention. The system of FIG. 1 includes a waveform generator 10 which is connected as shown with an antenna 20 and a receiver 30. It will be understood that functions of a transmitter and the receiver can be combined into one unit referred to as a transceiver. The antenna 20 is in turn connected to the receiver 30. The receiver 30 is connected to an IF receiver 40 which in turn is connected to a vector signal processor (VSP) 50. Here and elsewhere, to say that two or more elements are "connected" means signals can propagate between or among the elements, either directly or indirectly.

The waveform generator 10 generates the signal to drive the antenna. As will be described in more detail below, it includes a frequency agile synthesizer. The signal from the synthesizer is the basis for generating a pseudo-random frequency agile, high PRF waveform to be used for high range resolution processing and Doppler beam sharpening processing as well as for target recognition and target tracking. The pulse width, frequency, and PRF of the output waveform are each variable as desired. The waveform generator 10 also impresses an arbitrary phase code on each pulse transmitted.

The antenna 20 in this system may be a known antenna such as a Cassegrainian reflector, a horn, a dual polarization monopulse antenna having multiple receive channels, or another type of antenna. The antenna 20 receives the waveform from the waveform generator 10, transmits it, and receives return signals that have reflected off an object.

As will be explained more completely below, the receiver 30 receives the signals from the antenna 20, conditions them, and relays them to the IF receiver 40. The IF receiver 40 receives the controlled signals transmitted by the waveform generator 10 through the receiver 30 at a predetermined intermediate frequency. The VSP 50 receives the output of the IF receiver 40 and interprets a received pulse repetition frequency, pulse compressed waveform based on the signals output from the IF receiver 40 within the predetermined intermediate frequency for reporting target information.

The received pulse repetition frequency, pulse compressed waveform may be a high PRF in an embodiment of the present invention, but the system also operates at low and medium PRF in other embodiments as well. The high PRF provides a higher average power than the low and medium PRFs. The VSP 50 interprets the received PRF, pulse compressed waveform from the IF receiver 40 within the predetermined frequency and reports target information. The target information includes target size, range and tracking information calculated based on a target analysis using known algorithms such as constant false alarm rate (CFAR), for example.

Figure 2:
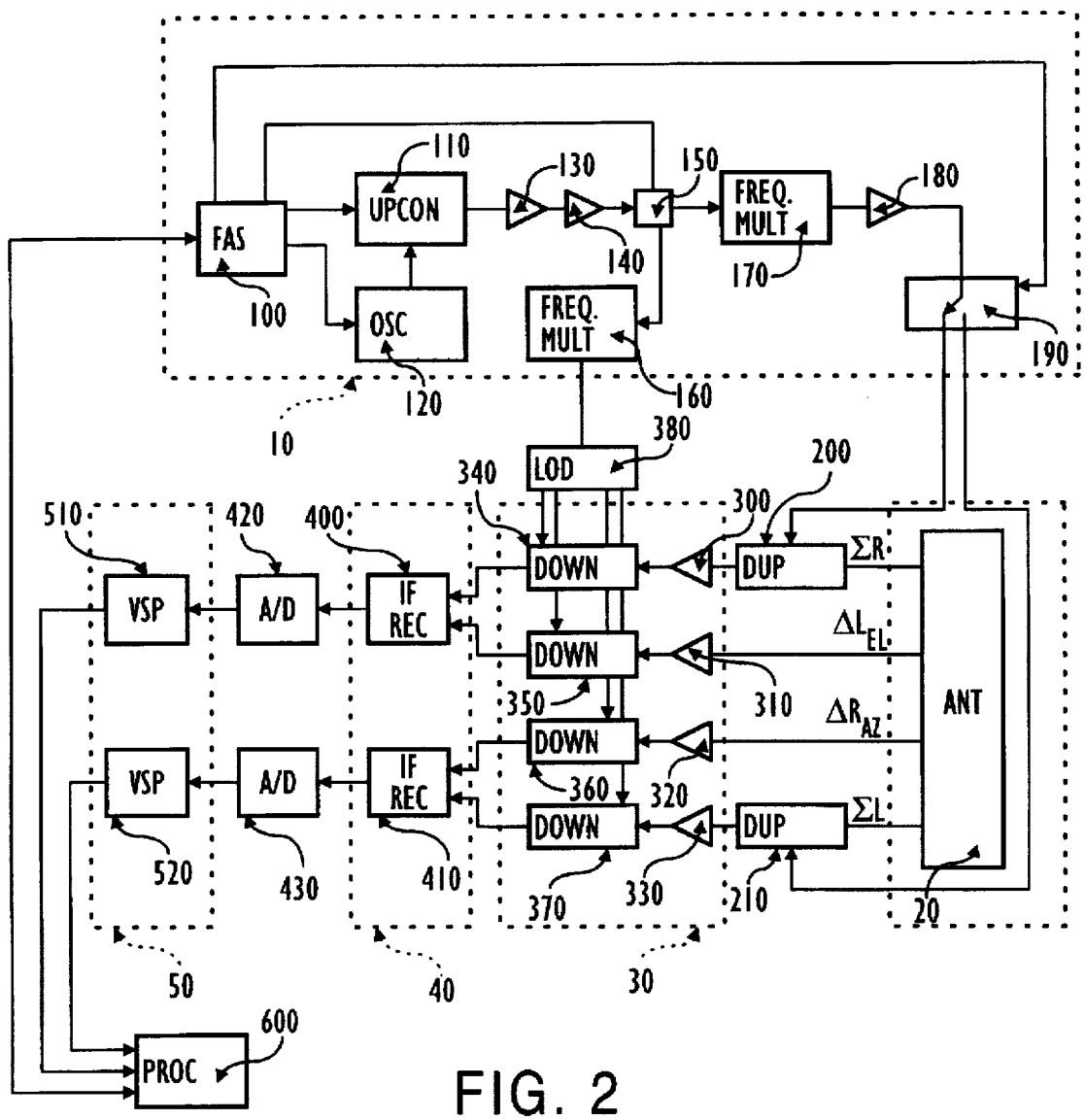
FIG. 2 is a more detailed functional block diagram of a possible implementation of the millimeter wave system of FIG. 1.

FIG. 2 is a more a detailed circuit diagram of a system such as that shown in FIG. 1. FIG. 2 illustrates a W-band seeker. The waveform generator 10 for the W-band seeker for this embodiment includes a frequency agile synthesizer 100. The output of the frequency agile synthesizer 100 is connected to a Ka-band upconverter 110 and a Ka-band phase locked oscillator OSC 120. The OSC 120 is connected to the Ka-band upconverter 110 which is phase locked to the reference of the frequency agile synthesizer 100. The Ka-band upconverter 110 upconverts the output of the frequency agile synthesizer 100 based on the output from the OSC120 to a similar millimeter wave frequency. The Ka-band upconverter 110 includes a bandpass filter. The output of the Ka-band upconverter 110 is connected to an isolation/power amplifiers 130 and 140 to drive downstream frequency multipliers as will be described. The amplifiers 130 and 140 must operate in a manner which preserves the phase code of the generated waveform.

In the embodiment illustrated in FIG. 2, the output of the power amplifier 140 is connected to a transmit/receive (T/R) switch 150. The T/R switch 150 directs the amplified upconverter output either to a first frequency multiplier 160 or a second frequency multiplier 170 in response to an output of the frequency agile synthesizer 100. Either first frequency multiplier 160 or second frequency multiplier 170 multiplies the millimeter wave frequency to a higher frequency by the selected frequency multiplier as desired. For example, the frequency may be trebled. When the frequency multiplier 170 is selected, the output is sent to an amplifier 180 and then to a polarization switch 190. The switch 190 sends the amplified output of the second frequency multiplier 170 to either a first duplexer 200 or a second duplexer 210 in response to an output of the frequency agile synthesizer 100.

The signal from the duplexers 200 and 210 is then coupled to the antenna 20. The antenna 20 in this example may be a dual circularly polarized monopulse antenna. As a result of the coupled energy, the antenna 20 radiates a signal and then receives a return pulse.

The power requirements for the amplifier 180 are determined with reference to what is needed for a high PRF, pulse compressed, low peak power waveform. A travelling wave tube or other power amplifying device can be used as the amplifier 180 if necessary.

The waveforms are also subjected to pulse compression which involves sending a long transmit pulse with a special phase code. See, Skolnick, *Radar Handbook*, Section 10.6 (McGraw-Hill, Inc., 2d. Ed., 1990). Each pulse is divided into a number of subpulses of equal duration. Each subpulse has a particular phase selected in accordance with a predetermined code sequence. With biphase coding, the binary code is a sequence of two values (usually 0s and 1s or +1s and −1s). The phase of the transmitted signal alternates between 0° and 180° in accordance with the sequence of elements. It is preferable to use the special class of binary codes known as "Barker" codes. These codes have the property of exhibiting minimum side lobes when compressed.

After the coded pulse is sent and the return signal received and conditioned, the pulse is compressed. Pulse compression may comprise an acoustic delay line compressor located in the IF receiver section or a digital algorithm implemented in the signal processor. For example, the pulse may be compressed by generating a sequence of delayed signals delayed with respect to one another by a delay equal to one to one phase code pulse length. The delayed signals are then summed with either a +1 or −1 weighting. The result of this summing is close to zero except when the target lines up with the delay line in which case the result increases to N times the signal return. Therefore, a long low power pulse looks like a short, high powered pulse.

AB-BA coding is a refinement of pulse compression. When a pulse is compressed, time side lobes may be generated. Time side lobes look like targets and are undesirable. To suppress time side lobes, two separate codes (an A code and a B code) are sent first in one order (say, AB) and then the other (BA). The returns can then averaged to suppress time side lobes. In digital pulse compression using complementary phase code pairs designated A and B, the A and B coded pulses are generated at a given frequency on successive pulses or on successive ramps as required to ensure unambiguous range operation for the range/pulse repetition frequency combination. Following pulse compression processing on individual pulses, the resultant A and B coded data for a given frequency are summed to reduce the time side lobes. In the resent embodiment, a processor 600 described below sends the phase codes to the frequency agile synthesizer, which then uses the phase codes as the basis for its synthesis.

Furthermore, a frequency hopping pattern may be implemented such that the second and third time around returns from non-targets at long distances are excluded from signal processing by placement of these returns outside the instantaneous passband of the receiver. If at time $t_n$, a frequency $f_n$ is transmitted, then for frequencies $f_{n+1}$ and $f_{n+2}$ transmitted at times $t_{n+1}$ and $t_{n+2}$, respectively, the absolute value of $f_n-f_{n+1}$ and $f_n-f_{n+2}$ must be greater than twice the transmitted pulse bandwidth to ensure passband rejection of $f_{n+1}$ and $f_{n+2}$ when $f_n$ is being received. This must be true for all frequencies in a given processing interval (dwell).

As mentioned, the antenna 20 for the present embodiment may be a Cassegrainian dual-reflector antenna having collimator, circular polarizer and amplitude monopulse feed subassemblies. This is a known antenna for seeker applications. The Cassegrainian antenna has a network of hybrids which produce for each polarization a sum channel signal which is proportional to the power received and a difference channel signal which is zero when the target is exactly on axis and varies positively and negatively as the target moves to one side or another.

The combination of these signals is used to derive tracking information. The sum channel signals are connected to the duplexers 200 and 210, respectively, and the outputs of the duplexers 200 and 210 along with the difference channel signals are respectively connected to low noise amplifiers 300, 310, 320, and 330. The outputs of the low noise amplifiers 300, 310, 320, and 330 are respectively connected to downconverters 340, 350, 360, and 370. A local oscillator frequency for the downconverters originates from the first frequency multiplier 160 when selected by switch 150. The local oscillator frequency reaches the downconverters through a local oscillator distribution circuit LOD 380.

The downconverters 340 and 350 are connected to an IF receiver 400 and the down converters 360 and 370 are connected to an IF receiver 410 in the IF receiver section 40. Both IF receivers allow the four receiver channels to be multiplexed into two channels, reducing the number of analog to digital conversions needed. The IF receivers convert the received signal to baseband in-phase and quadrature outputs. The outputs of the IF receivers 400 and 410 are connected to high speed A/D converters 420 and 430, respectively. The A/D converters have a clock which is synchronous with all other system frequencies. The outputs of the A/D converters 420 and 430 are output to first and second vector signal processors (VSPs) 500 and 510 in VSP section 50 for performing pulse compression as described and target detection.

Figure 3:
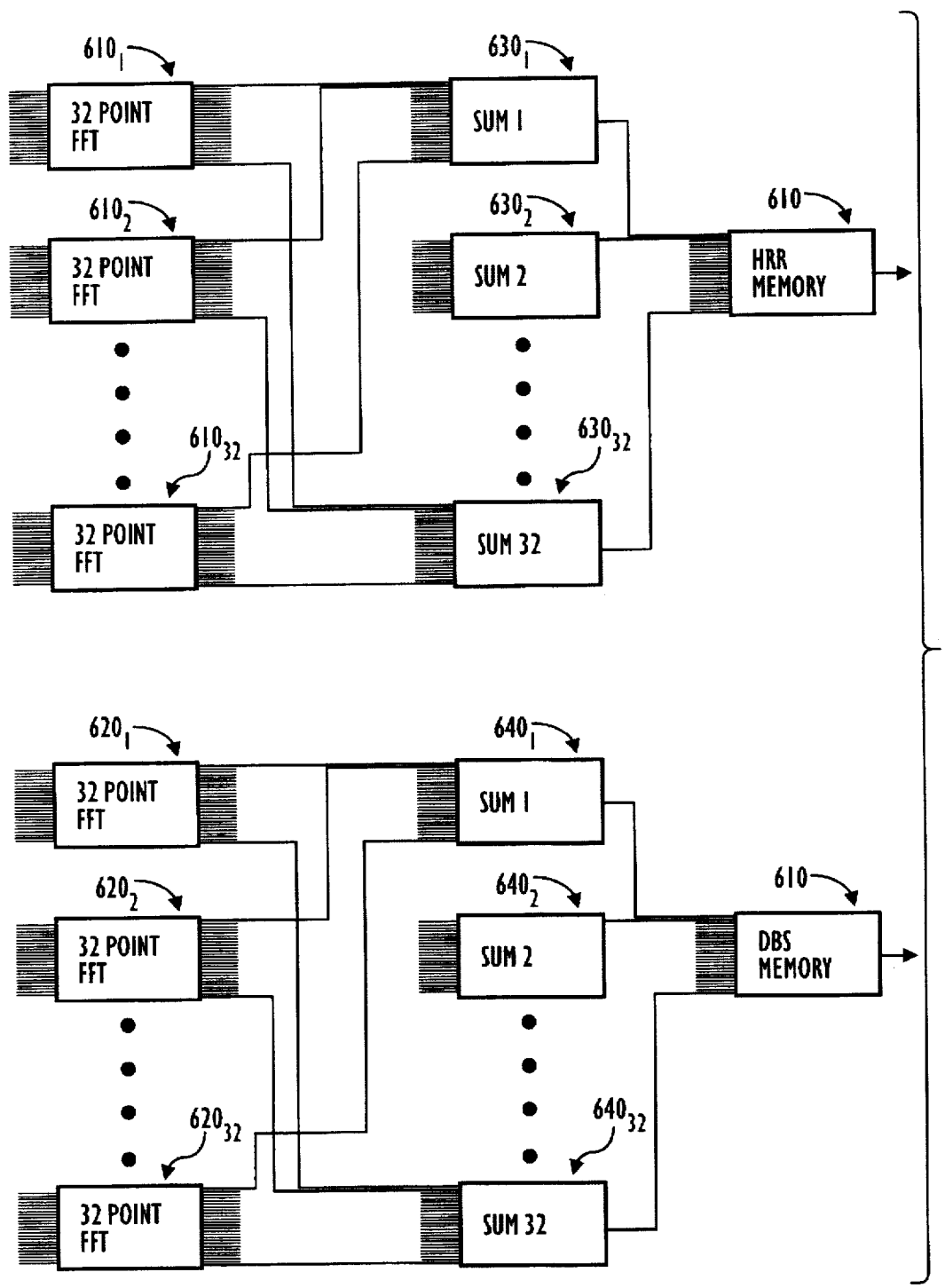
FIG. 3 is a functional block diagram of a waveform processor which may be incorporated into the present invention.

The VSPs 500 and 510 are connected to a digital processor 600 which receives the high PRF/high duty cycle waveform incorporating digital pulse compression and digital I/Q generation. FIG. 3 illustrates a waveform processor 600 for receiving and processing the high PRF, frequency stepped waveform. The waveform processor 600 includes a plurality of 32-Point FFTs $610_1$, $610_2$, ... $610_{32}$ and $620_1$, $620_2$, ... $620_{32}$ and a plurality of summing circuits $630_1$, $630_2$, ... $630_{32}$ and $640_1$, $640_2$, ... $640_{32}$ for processing a waveform. The waveform processor 600 operates by stepping 32 times within a ramp. The step size may be 265 kHz. A template may include, for example, 32 ramps, and a dwell may consist of five templates. The 32 ramp inputs and 32 frequency inputs are respectively processed by the FFTs 610 and 620 and then summed in the summing circuits 630 and 640. The summed ramp signals are processed and stored in a high range resolution (HRR) memory 650. The process is repeated for each range bin and receiver channel. At the same time, the 32 frequency signals are processed and stored in a Doppler beam sharpening (DBS) processor 660 and is also repeated for each range bin and receiver channel.

A single frequency radar with a single PRF cannot unambiguously resolve the range to targets if the range is farther away than 2PRF/c due to the returned pulse from the "second time around" from the target. In the present system, however, the high speed of the frequency agile synthesizer 100 allows frequency changes for each pulse. The system transmits a series of frequencies having a psuedo-random pattern and "listens for" only the n−1, n−2, or n−3 frequencies. The system also does not repeat a frequency until all frequencies in a predetermined set of frequencies (a template, which is 32 ramps in the embodiment under consideration) have been used. Accordingly, only targets in a "correct" range appear at the receiver output. As a side benefit, since the transmitted signals are spread out instead of being in a continuous sequence, it is harder for a hostile listener to detect them.

The method of frequency interleaving for resolving range ambiguity performed as described above requires a rough estimate of the target range. Such a rough estimate is generally available, however, when searching for a target, in contrast to tracking a target. This estimated range is at the maximum detectable range for the target being searched for. Frequencies are then sent that increase or at least change from pulse-to-pulse so that pulses occur at a rate faster than they can return for a target at a maximum range.

For example, if the ambiguous range is 300 feet, a target at a range of 3000 feet can be detected by the present system. The local oscillator signal, that comes from the same synthesizer as the transmit signal, bounces between transmit and receive. Therefore, the detection of a target would not be expected until 10 pulses are transmitted (3000 feet divided by 300 feet) and a frequency pattern of $f_1$, $f_2$, $f_3$, ... $f_{10}$ has been sent. After the frequency $f_{10}$ is sent, the local oscillator switches to the appropriate frequency to receive $f_1$, then a switch is made to transmit a frequency $f_{11}$, next the appropriate frequency is switched for receiving $f_2$, and then switching to transmit frequency $f_{12}$ and so on. This interleaving of frequencies continues according to this pattern. If the local oscillator frequency is not correct for a given transmit frequency, the frequency falls outside of the system bandwidth and is not detected. Thus, by interleaving frequencies, the range ambiguity is resolved and after a target is detected, the transmit/receive pattern can be continuously changed as well as the PRF if necessary, to keep the target in the desired range gate.

In general, targets far beyond the ambiguous range may be detected by transmitting a series of frequencies and then waiting long enough for the target to return to switch to the appropriate local oscillator frequency. The frequency transmission pattern must be selected such that the frequencies $f_1$, $f_2$, $f_3$, ... are not immediately adjacent and successive frequencies must be far enough apart so that they do not get through the receiver passband.

In one example of the present system there are 16 MHz frequency steps and a pulse width of 32 nanoseconds. Therefore, the IF filter must be 32 MHz wide (1/32 nanoseconds). If a given frequency is sent and then moved 16 MHz to transmit the next frequency, the second pulse return is within the 32 MHz passband of the receiver and will be improperly detected as a target. The second transmitted frequency must be 5 or 10 steps away to prevent this by having the return be well outside the receiver passband.

In one embodiment, the frequency agile synthesizer 100 used for transmitting and the offset signal used for receiving may include a four tone generator which feeds mix and divide circuitry in one embodiment. Programmable PRFs up to 500 kHz can be implemented. Offset local oscillator generation circuitry allows a received pulse to be sandwiched between subsequent transmit pulses of different frequencies which is required for unambiguous range operation. The ramp time and not the pulse repetition interval (PRI) determines the ambiguous range because pulses are "tagged" through frequency stepping. The resulting high PRF waveform increases the average power and provides a fixed detection range, reduces the peak transmitter power for a fixed detection range and increases the detection range for a fixed transmitter power if the radar is not clutter-limited. Programmability of the frequency agile synthesizer 100 enhances the applicability to multiple systems so that low and medium PRFs can be implemented with associated increases in the PC ratios to yield the required average power. Also, the inherent pseudo-random hopping capability improves electronic counter-countermeasures.

A low peak power transmitter approach significantly reduces cost relative to a high peak power unit by simplifying modulator circuitry, eliminating high voltage power supply and increasing reliability. Phase coding within a long pulse allows digital pulse compression, which yields an equal or greater average power than a short pulse, high peak power transmitter scheme. The low noise amplifiers 300, 310, 320, and 330 reduce system noise by 2 to 4 dB over comparable mixer implementations. For the same performance, the transmitter power output requirement is reduced and for the same transmitter output power, the operational range of the seekers are increased.

Figure 4:
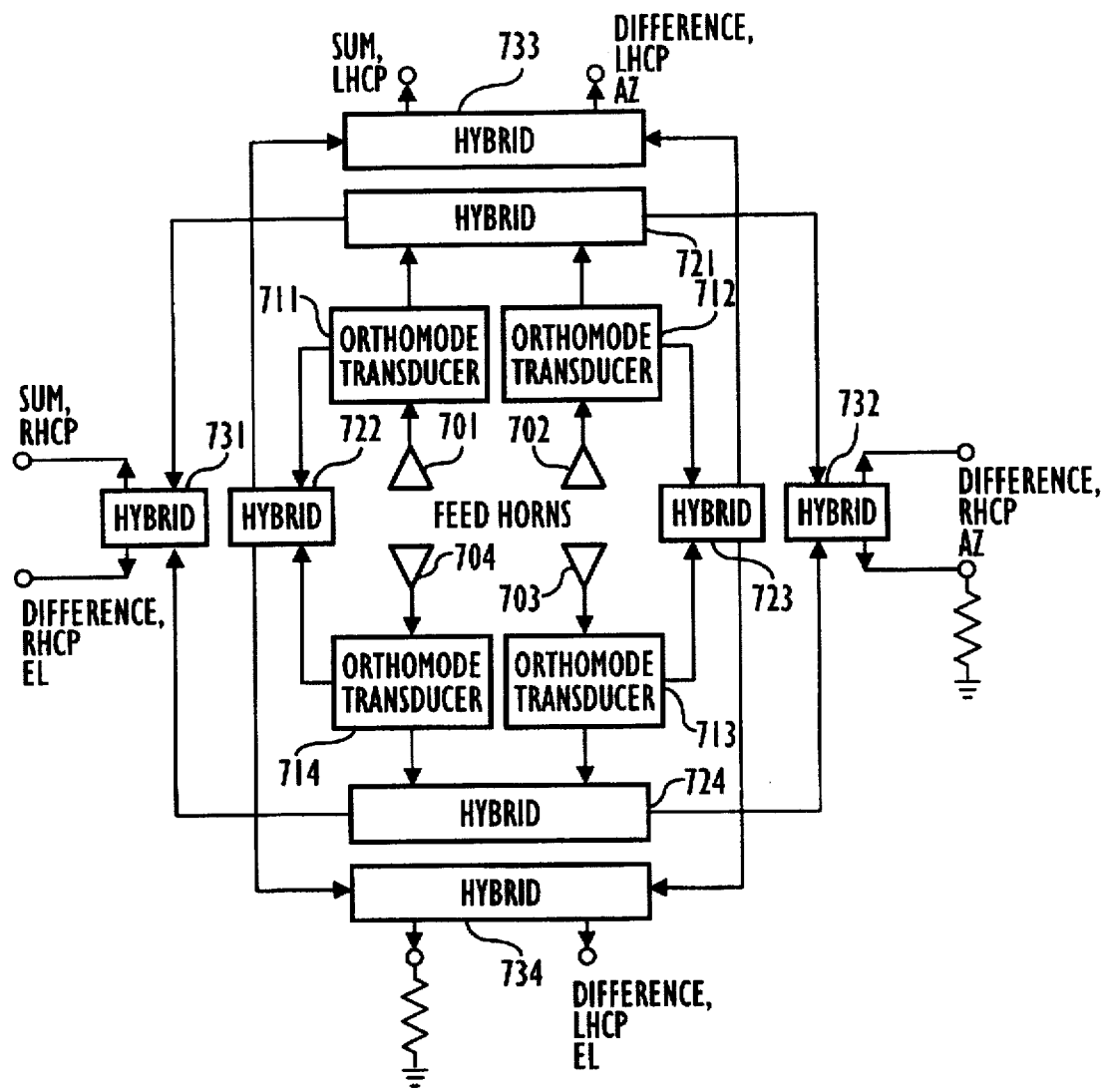
FIG. 4 is a functional block diagram of a six port monopulse dual circular polarization antenna which may be incorporated into an embodiment of the present invention.

The antenna 20 which is a dual circularly polarized antenna for the embodiment illustrated in FIG. 2 allows true monopulse operation. FIG. 4 illustrates a six port monopulse design for use in a system according to the invention. In FIG. 4, the outputs of feed horns 701, 702, 703, and 704 are input to orthomode transducers 711, 712, 713, and 714. The outputs of the orthomode transducers 711 and 712 are sent to a hybrid circuit 721, the output from the orthomode transducer 711 is sent to a hybrid circuit 722 and the output from the orthomode transducer 712 is sent to a hybrid circuit 723. Similarly, the outputs from orthomode transducers 713 and 714 are sent to a hybrid circuit 724, the output of orthomode transducer 713 is sent to the hybrid circuit 723 and the output of the orthomode transducer 714 is sent to the hybrid circuit 722. The outputs of hybrid circuits 721 and 724 are sent to the hybrid circuits 731 and 732. Also, the outputs of hybrid circuits 722 and 723 are sent to hybrid circuits 733 and 734. As a result of this processing, the hybrid circuit 733 outputs a sum signal for lefthand circular polarization and a difference signal for the lefthand circular polarization of the azimuth, the hybrid circuit 734 outputs a difference signal for lefthand circular polarization of the elevation, the hybrid circuit 731 outputs a sum signal for righthand circular polarization and a difference signal for righthand circular polarization of elevation and the hybrid circuit 732 outputs a difference signal for righthand circular polarization of the azimuth.

To achieve the output levels necessary for all weather seeker range performance, improved power combining techniques have been used in the system for the embodiments of the present invention. A low peak power, long pulse transmit waveform eliminates requirements for complex high peak power, short pulse transmitters. The present seeker system cuts the power requirement in half. Accordingly, the present invention provides a seeker having several MMIC circuits wherein the seeker is 1) fully coherent, 2) capable of high pulse rate repetition rates (in excess of 1 MHz), 3) has no transmit duty cycle restrictions, 4) can transmit complex phase and frequency modulated waveforms, 5) can resolve range ambiguities by a frequency interleaving scheme at high PRD and 6) has a complementary phase coding scheme to allow high range resolution profile processing with the above waveforms.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. Apparatus comprising:

a waveform generator for generating an interleaved waveform and a second output coherent with said waveform, said waveform generator including a frequency agile synthesizer capable of changing its output frequency to produce said interleaved waveform using multiple frequencies, a frequency and phase of said waveform, and said second output, being based on said output of said frequency synthesizer;

an antenna coupled to said waveform generator for transmitting said waveform, for receiving a return signal, and for generating at least one antenna output signal on the basis of said return signal;

a receiver coupled to said antenna and to said waveform generator to detect said return signal as a frequency interleaved signal, an interleaving of said frequency interleaved signal being selected to define an unambiguous range of said antenna, said receiver receiving said antenna output signal and said second output and converting said return signal on the basis of said second output signal to produce a converted signal; and a processor for processing said converted signal to derive target data.

2. Apparatus as claimed in claim 1 wherein said frequency agile synthesizer is capable of changing its output frequency in a psuedorandom manner.

3. Apparatus as claimed in claim 1 wherein said frequency agile synthesizer is capable of changing its output pulse width.

4. Apparatus as claimed in claim 1 wherein said frequency agile synthesizer is capable of changing its pulse repetition frequency.

5. Apparatus as claimed in claim 1 wherein said frequency agile synthesizer is capable of impressing an arbitrary phase code on each pulse transmitted and wherein said processor performs pulse compression on the basis of said phase code.

6. Apparatus as claimed in claim 1 wherein said waveform generator further includes:

a millimeter wave phase locked oscillator connected to said frequency agile synthesizer for generating a millimeter wave oscillator output which is phase coherent with said frequency agile synthesizer output frequency, and a frequency upconverter connected to said frequency agile synthesizer and to said phase locked oscillator for generating an upconverted output signal which is a millimeter wave multiple of and phase coherent with said frequency agile synthesizer output.

7. Apparatus as claimed in claim 6 wherein said waveform generator further includes:

a first frequency multiplier having said waveform as its output;

a second frequency multiplier having said second output as its output; and a switch connected to the frequency upconverter for selectably connecting said upconverted output signal to said first frequency multiplier or said second frequency multiplier under control of said frequency agile synthesizer.

8. Apparatus as claimed in claim 7 wherein said frequency agile synthesizer controls said switch to connect said upconverted output signal to said first frequency multiplier during a transmit operation and controls said switch to connect said upconverted output signal to said second frequency multiplier during a receive operation.

9. A millimeter wave seeker system according to claim 1, wherein said antenna comprises a Cassegrainian dual-reflector antenna having a plurality of subassemblies for providing monopulse returns in both azimuth and elevation.

10. A millimeter wave seeker system according to claim 9, wherein said plurality of subassemblies comprise a collimator, a circular polarizer and an amplitude monopulse feed.

11. Apparatus as claimed in claim 1 wherein said receiver comprises at least one frequency downconverter connected to said antenna for converting said antenna output signal m a lower frequency signal, said downconverter being connected to receive said second output and generating said lower frequency signal to be phase coherent with said second output.

12. Apparatus as claimed in claim 11 wherein said receiver includes at least one IF receiver connected to said frequency downconverter for converting the lower frequency signal to baseband in-phase and quadrature outputs.

13. Apparatus as claimed in claim 1 wherein said antenna produces a first antenna output signal and a second antenna output signal, wherein said receiver comprises a first frequency downconverter connected to said antenna for converting said first antenna output signal to a first lower frequency signal and a second frequency downconverter connected to said antenna for converting said second antenna output signal to a second first lower frequency signal.

14. Apparatus as claimed in claim 13 wherein said receiver includes at least one IF receiver connected to said first frequency downconverter and said second frequency downconverter for converting the first and second lower frequency signals to baseband in-phase and quadrature outputs.

15. Apparatus as claimed in claim 1 wherein said processor processes said converted signal to derive target detection data.

16. Apparatus as claimed in claim 1 wherein said processor processes said converted signal to derive target tracking data.

17. Apparatus as claimed in claim 1, wherein said processor sends phase codes to transmit to the frequency agile synthesizer, such that said phase codes may be compressed when received by said processor.

18. A method comprising the steps of:

generating an interleaved waveform and a second output coherent with said waveform by using a frequency agile synthesizer capable of changing its output frequency to produce said interleaved waveform using multiple frequencies, a frequency and phase of said waveform, and said second output, being based on said output frequency of said frequency synthesizer;

transmitting said waveform;

receiving a frequency interleaved return signal, an interleaving of said frequency interleaved return signal being selected to define an unambiguous range of said antenna;

generating at least one antenna signal on the basis of said return signal;

converting said return signal on the basis of said second output signal to produce a converted signal; and processing said converted signal to derive target data.

19. A method as claimed in claim 18 wherein said frequency agile synthesizer changes its output frequency in a psuedorandom manner.

20. A method as claimed in claim 18 wherein said frequency agile synthesizer changes its output pulse width.

21. A method as claimed in claim 18 wherein said frequency agile synthesizer changes its pulse repetition frequency.

22. A method as claimed in claim 18 wherein said frequency agile synthesizer impresses an arbitrary phase code on each pulse transmitted and wherein said processing includes pulse compression on the basis of said phase code.

23. A method as claimed in claim 18 wherein said waveform generating step comprises the steps of:

upconverting the output of the frequency agile synthesizer to produce an upconverted output signal which is a millimeter wave multiple of and phase coherent with said frequency agile synthesizer output, and selectably connecting said upconverted output signal under control of said frequency agile synthesizer to a first frequency multiplier to produce said waveform or a second frequency multiplier to produce said second output.

24. A method as claimed in claim 18 wherein said converting step comprises converting said antenna output signal to a lower frequency signal which is phase coherent with said second output.

25. A method as claimed in claim 18 wherein said processor processes said converted signal to derive target detection data.

26. A method as claimed in claim 18 wherein said processor processes said converted signal to derive target tracking data.

27. Apparatus as claimed in claim 1, wherein said antenna transmits said waveform at a first transmit frequency while said return signal is received at a second receive frequency, different from said transmit frequency.

* * * * *

UNITED STATES PATENT AND TRADEMARK OFFICE
CERTIFICATE OF CORRECTION

PATENT NO. : 5,726,657
DATED : March 10, 1998
INVENTOR(S) : Albert N. PERGANDE et al It is certified that error appears in the above-indentified patent and that said Letters Patent is hereby corrected as shown below:

Column 2, line 1, change "$T=\frac{F}{1}$" to $-T=\frac{1}{F}-$

Column 7, line 64, change "$\frac{2PRF}{c}$" to $-\frac{c}{2PRF}-$

Signed and Sealed this

Sixth Day of October, 1998

*Attest:*

BRUCE LEHMAN

*Attesting Officer*   *Commissioner of Patents and Trademarks*